May 26, 1959 T. REUMERMAN ET AL 2,888,199

DEVICES FOR DETERMINING CHECK SYMBOLS

Original Filed March 6, 1951 2 Sheets-Sheet 1

May 26, 1959 T. REUMERMAN ET AL 2,888,199

DEVICES FOR DETERMINING CHECK SYMBOLS

Original Filed March 6, 1951 2 Sheets-Sheet 2

United States Patent Office 2,888,199

Patented May 26, 1959

2,888,199

DEVICES FOR DETERMINING CHECK SYMBOLS

Theodorus Reumerman, Zandvoort, and Willem H. T. Helmig, Leiden, Netherlands

Original application March 6, 1951, Serial No. 214,178, now Patent No. 2,754,054, dated July 10, 1956. Divided and this application August 10, 1955, Serial No. 527,596

7 Claims. (Cl. 235—153)

This application is a division of our copending application Serial No. 214,178, now Patent No. 2,754,054 filed on March 6, 1951.

The invention relates to a device for facilitating the detection of errors in arbitrary symbol groups composed out of a given series of $n$ symbols. In this connection, the term "symbols" designates symbols of any kind which may be used for indicating or recording a concept, such as, for instance, letters, figures, punctuation marks, and the like.

In order to express certain concepts by means of symbols, the same are combined into symbol groups. The term "symbol groups" designates, for instance: words, numbers, sequences of a plurality of words or numbers, and sentences consisting of words, punctuation marks, and numbers.

In general, the number of symbols from which a selection may be made in composing a symbol group is determined by an agreement, or by the nature of the apparatus used for recording or transmitting the symbol group. For instance, in the transmission of code messages by means of a letter code, there exists an agreement to the effect that no other symbols shall be used than the 26 letters of the alphabet. Hence, the code message consists of symbol groups which are each composed out of a given series of 26 symbols ($n=26$).

In machines for handling symbol groups which are operated by means of a key board or a similar operating mechanism, such as, for instance, typewriters, composing machines, teleprinters, punching machines for preparing record cards for administrative and statistical purposes, cash registers, and various kinds of calculating and bookkeeping machines, symbol groups can only be composed out of those symbols which can be selected by means of the key board. Hence, the number $n$ is equal to the number of different symbols indicated on the keys.

In various devices for indicating, recording and transmitting numbers, such as, for instance, measuring devices, counters, numbering devices, apparatus for automatic telephony, and the like, groups are composed out of a given series of 10 symbols ($n=10$).

In practice, frequent errors appear to occur in symbol groups of all kinds. These errors are partly brought about by a faulty operation of devices by means of which the symbol groups are recorded or transmitted, and partly by mistakes of persons working the said devices, or copying the symbol groups. The most frequently occurring error consists therein that a wrong symbol appears in one position of a symbol group; this error will be designated hereinafter by the term "one symbol error." Another error which occurs rather frequently, mainly due to human mistakes, consists therein that two adjacent symbols of a group have changed places with each other; this error will be designated hereinafter by the term "transposition error."

In general, the detection of errors in symbol groups involves a laborious checking process and in many cases, the errors which have been made are only brought to light by accident, or they are not detected at all.

However, the detection of errors in symbol groups may be considerably facilitated by making use of a device comprising means for determining a check symbol for each symbol group, said check symbol giving a univocal indication of the remainder $R_N(G)$ obtained on dividing a number G by a whole number N, the symbols of the given series being numbered in a predetermined manner, the said number G being equal to the algebraic sum of the numbers of the symbols of the group, each multiplied by a whole factor $k_i$, the said factors $k_i$ being dependent on the position of the symbol in the group and different for adjacent positions, and the said number N being greater than or equal to $n$ and having no divisors in common with the factors $k_i$ and with the differences between the factors $k_i$ for adjacent positions.

As appears from the above, a numbering of the symbols of the given series must precede the construction of such a device. In the device, this numbering finds expression in the order in which the symbols are placed, or in which means for handling the symbols are arranged. In general, if the given symbol series consists of the figures from 0 to 9, it will be preferable for practical reasons to number the symbols according to the numerical value of the figures, so that the numbers from 0 to 9 are ascribed to the figures from 0 to 9. If the given symbol series consists of the letters of the alphabet, it is advisable to number these letters in their usual order, for instance: $A=0, B=1, C=2$, etc.

By means of the above-mentioned device, a check symbol may be determined for a given symbol group which indicates the remainder $R_N(G)$ obtained on dividing a number G, designated hereinafter by the term "check number," by a given whole number N. As this remainder may assume N different values, N symbols are required to indicate the remainder in a univocal manner; hence, the check symbols are to be selected from a series of N symbols.

The above-mentioned check number G is equal to the algebraic sum of the numbers of the symbols of the group, each multiplied by a whole factor $k_i$ dependent on the position of the symbol in the group. Hereinafter, the position of a symbol in a group will always be determined by counting the positions from right to left. If the symbol appearing in position $i$ of the group is called $A_i$, and the number of this symbol $a_i$, and if the multiplication factor $k_i$ prevails for position $i$, the check number G of the group $A_qA_{q-} \ldots A_3A_2A_1$ is equal to $\Sigma k_ia_i$.

The factors $k_i$ and the number N are chosen in such manner that a one symbol error, as well as a transposition of two adjacent symbols of the group, will always lead to an alteration of the check symbol pertaining to the group, so that the said errors may be detected at any time by determining the check symbol again, and by comparing the same with the check symbol which has been initially determined. The conditions to be satisfied to this end by the number N and the factors $k_i$ will now be explained.

In the case of a one symbol error, the symbol $A_i$ initially appearing in position $i$ of the symbol group has been replaced by another symbol $A_x$ which may be assumed to have the number $a_x$. Hence, the check number G of the group has been increased by an amount $k_i(a_x-a_i)$, and the check symbol of the group will have been altered by the error if $R_N[k_i(a_x-a_i)]\neq0$. First of all, the numbers $k_i$ *and* $(a_x-a_i)$ must be indivisible by N to this end. The absolute value of the difference $(a_x-a_i)$ may vary from 1 to $(n-1)$; hence if N is selected to be greater than or equal to $n$, it is certain that $(a_x-a_i)$ will be indivisible by N. If, furthermore, all the factors $k_i$ are chosen in such manner as to be indivisible by N, the above-mentioned condition is satisfied. However, there is still a possibility that N is equal to the product of two numbers $p$ and $q$, $k_i$ being divisible by $p$ and $(a_x-a_i)$ being divisible by $q$. In this case, the product $k_i(a_x-a_i)$ would be divisible by N, so that $R_N(G)$ would not have been altered by the error. In order to exclude this possibility, care has to be taken that N has no divisors in common with the factors $k_i$. If the concept "divisor of a number" is defined in such manner as to include the number itself (so that, for instance, the divisors of the number 45 would be the numbers, 3, 5, 9, 15 and 45), this condition includes the above-mentioned condition that the factors $k_i$ must be indivisible by N; hereinafter, the term "divisor" will always be used in this sense.

In the case of a transposition error, the symbols $A_i$ and $A_j$ initially appearing in positions $i$ and $j$ of the group, have changed places with each other. Hence the check number of the group has been increased by an amount $k_i(a_j-a_i)+k_j(a_i-a_j)=(k_i-k_j).(a_j-a_i)$, and the check symbol of the group will have been altered by the error if $R_N[(k_i-k_j)(a_j-a_i)]\neq 0$. To this end, the factors $k_i$ and $k_j$ must be different, and furthermore, it may be inferred by means of the train of thought followed hereinbefore that N may not have any divisors in common with the difference $(k_i-k_j)$. Hence, if a transposition of two adjacent symbols is required to lead to an alteration of the check symbol in all cases, the factors $k_i$ for adjacent positions must be different, and N may not have any divisors in common with the differences between factors $k_i$ for adjacent positions. If it is desired that each transposition of two arbitrary symbols of the group shall lead to an alteration of the check symbol, the more stringent requirement must be made that all factors $k_i$ are different and that N has no divisors in common with any difference between two factors $k_i$. In general, however, this latter requirement is not necessary, since transposition of adjacent symbols are by far the most frequent.

As appears from the above explanation, the device will have to satisfy the conditions that the factors $k_i$ are different at least for adjacent positions in the symbol group, and that N is greater than or equal to $n$, and has no divisors in common with the factors $k_i$ and with the differences between the factors $k_i$ for adjacent positions.

According to the said conditions, N must be an odd number. For if N would be even, all factors $k_i$ should be odd, as otherwise they would have the divisor 2 in common with N. However, in this case, the differences between the factors $k_i$ for adjacent positions would all be even, so that they would have the divisor 2 in common with N. Hence, the said conditions cannot be satisfied if N is even.

It will be clear that the greatest liberty in selecting the factors $k_i$ and the greatest certainty in detecting arbitrary transpositions may be obtained by selecting a prime number for N. In many cases, however, the same agreements will prevail, or the same apparatus will have to be used for recording or transmitting the check symbol as for composing the symbol groups, so that it is unavoidable to select the check symbols from the given series of $n$ symbols. As N different check symbols are required, N must be made equal to $n$ in these cases, or equal to $(n+1)$ if $n$ is even. If $N=n+1$, an open space (omission of the check symbol) may be used as an additional check symbol.

For instance, if the symbol groups are composed out of the figures from 0 to 9, and the same figures are also to be used as check symbols, there is no other choice that to make $N=11$. On the other hand, if other symbols, such as the letters of the alphabet, may be used as check symbols, N may also have another value, for instance 13, 17, 19 or 23.

If the symbols of the given series, out of which the symbol groups are composed, also serve as check symbols, it will generally be preferable for practical reasons to make the remainder $R_N(G)$ indicated by a given symbol equal to the number ascribed to the symbol in question. For instance, if the symbol groups are composed out of the figures from 0 to 9, which have been numbered according to their numerical value, it will generally be preferable to indicate the remainder 0 by the symbol 0, the remainder 1 by the symbol 1, etc., the open space (omission of the check symbol) serving to indicate the remainder 10.

In the case of symbol groups composed out of the figures from 0 to 9, i.e. of ordinary numbers, it is often suitable to choose the factors $k_i$ in which such manner that $k_i=R_N(10^{i-1})$, or $k_1=1$, $k_2=10$, $k_3=R_N(100)$, $k_4=R_N(1000)$, etc. By this measure, the remainder $R_N(G)$ indicated by the check symbol is made equal to the remainder obtained on dividing the symbol group itself by N, so that the check symbol pertaining to a given number may be found by dividing the number itself by N, and indicating the remainder obtained in this division by the symbol agreed on. If $N=11$, it will be necessary for this purpose to make $$k_1=k_3=k_5=\ldots=1$$

and $k_2=k_4=k_6=\ldots=10$, or (which amounts to the same thing): $k_1=k_3=k_5=\ldots=1$, and $$k_2=k_4=k_6=\ldots=-1$$

For $N=13$, one finds: $k_1=1$, $k_2=10$, $k_3=9$, $k_4=12$, $k_5=3$, $k_6=4$, $k_7=1$, $k_8=10$, etc.

Of course, in order that the correctness of a symbol group may be checked by means of the device according to the invention, the right check symbol must be known. Hence, the check symbol must be appended to the symbol group as soon as it has been determined for the first time, for instance by inserting the check symbol in the symbol group in a predetermined position, or by combining the check symbols of a sequence of symbol groups into a check group appended to said sequence. If care has been taken in this manner that the check symbol always accompanies the symbol group, the correctness of the symbol group may be checked at any time.

Preferably, the initial determination of the check symbol is performed during or immediately after the formation of the symbol group, so that a check is possible during the whole period of existence of the symbol group.

By thus providing each symbol group at birth with a check symbol which always accompanies the symbol group, a closed checking system is obtained, wherein every error made by man or machine may be detected, and wherein the occurrence of errors may even be completely prevented, if the checking is performed automatically by all machines that are used. The laborious checking jobs required up to now in many administrations may be reduced to a minimum by these means.

It is the object of the present invention to provide a device of the above-mentioned kind which is easy to operate, and which may be readily incorporated in any kind of business machine in order to check any symbol groups inserted therein together with an accompanying check symbol.

According to the invention, the selector of the device is formed as a key board wherein each key upon being depressed actuates a switch so as to close an electric circuit comprising means for displacing the indicator over a number of steps proportional to the number of the symbol selected by the key in question, and dependent on the position of the selected symbol in the symbol group.

Thus, the device according to the invention is provided with a key board, by means of which the symbols of the group to be checked may be selected, and with an indicator showing the check symbol pertaining to the selected group. The indicator may consist of a displaceable indicating member, such as a pointer or a window, which is moved along a fixed N-partite scale on which the check symbols are arranged in an order determined by the further construction of the device, or of a displaceable scale constructed in the above-described manner which is moved along a fixed indicating member. Upon each selection of a symbol, the indicator is displaced over a distance which is proportional to the number of the selected symbol, and which is further determined by the position of the symbol in the symbol group. If the said distances have been rightly chosen, the indicator will show the appertaining check symbol after selection of the complete symbol group. If, in order to obtain an automatic checking, the device according to the invention is incorporated in another apparatus, for instance in a calculating or bookkeeping machine, it will generally be preferable to use the key board of this apparatus simultaneously as a selector for the device according to the invention.

As stated hereinbefore, the displacement of the indicator caused by the selector upon selection of a symbol must be dependent on the position of the symbol in the symbol group. Hence, the position of the symbol in the symbol group must be recorded in some manner. This requirement may be satisfied by the use of a so-called full key board, which comprises a separate key group for each position in the symbol group to be selected. A different transmission is provided between each key group and the indicator, having a transmission ratio corresponding with the factor $k_i$ prevailing for the position in question, so that upon selection of a symbol group, the indicator is displaced over a number of steps corresponding with the check number of the symbol group so as to show the right check symbol. This will be more fully explained hereinafter with reference to an example. In general, a full key board is constructed in such manner that the first symbol from the right in each symbol group is bound to a fixed position so as to be always selected by means of one and the same key group. This means that, in such a device, the positions which a symbol may occupy in a symbol group are automatically numbered from right to left.

The exact nature of the present invention, and the manner in which the same is to be performed, will now be more fully explained with reference to the accompanying drawings, showing some embodiments of the invention.

Figure 1:
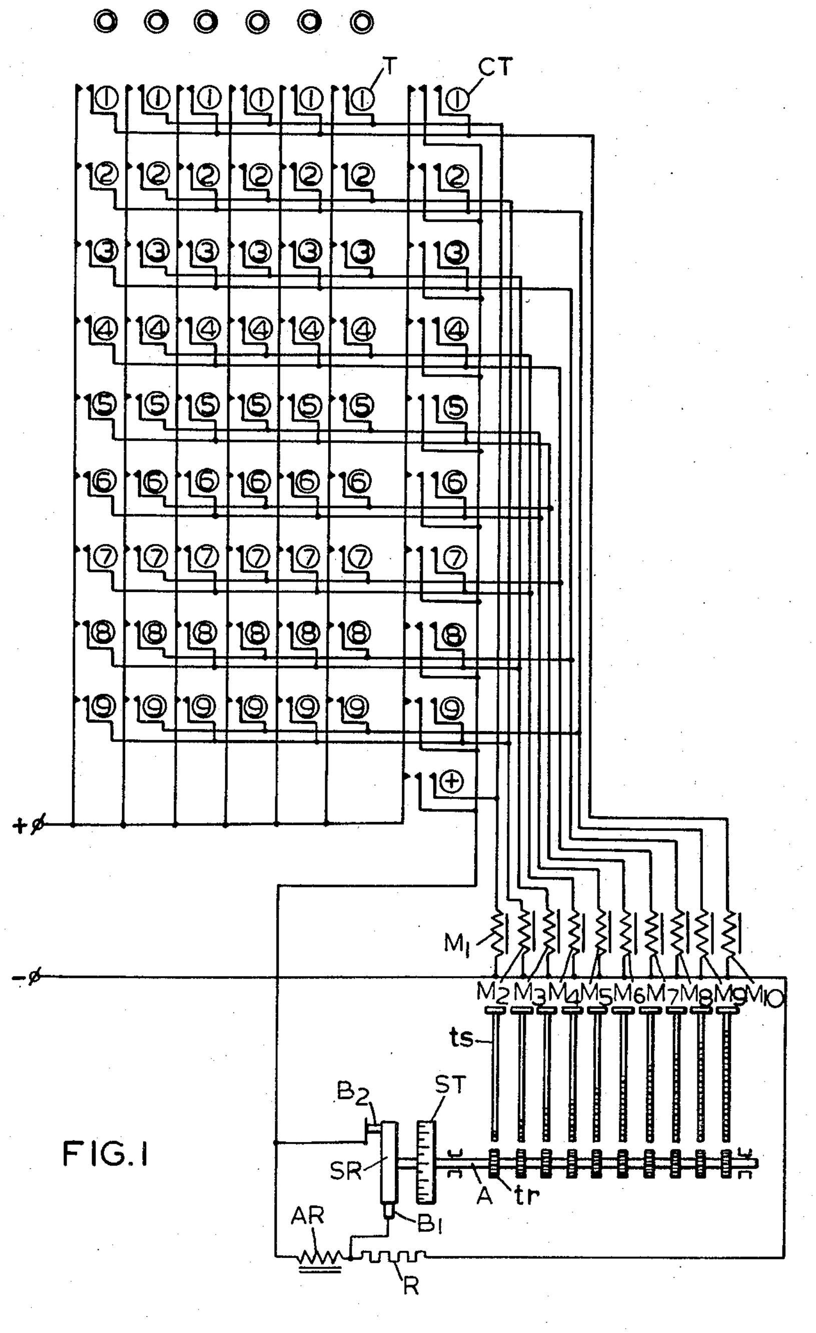
Fig. 1 is a circuit diagram of a device according to the invention which is operated by means of a so-called full key board, having a separate group of keys for each position in the symbol group. In the device shown in Fig. 1 the number N is equal to 11.

In the device shown in Fig. 1, the number N is equal to 11, and the factor $k_i$ is equal to 1 for all odd positions and to $-1$ for all even positions. The drawing shows at the left a group of sixty keys T, divided in six rows of ten keys each, and constituting the actuating means of a machine in which the device is incorporated. The keys of each row are marked with the figures from 0 to 9. Thus, a separate row of keys is provided for each position to be occupied by a symbol in the symbol group. At the right of the said key group an additional row of ten checking keys CT is provided; these keys are marked with the figures from 1 to 9, and with a plus sign, respectively, and serve for selecting the check symbols. Furthermore, the device comprises ten magnets $M_1$–$M_{10}$, adapted to drive the indicator shaft A over different numbers of steps. For this purpose, each of the said magnets cooperates with a toothed rack *ts* having a number of teeth corresponding with the index number of the magnet in question. Thus, the toothed rack cooperating with magnet $M_1$ has one tooth, the toothed rack cooperating with magnet $M_2$ has two teeth, and so on. Whenever one of the magnets $M_1$–$M_{10}$ is energized, the appertaining toothed rack *ts* moves over an associated gear wheel *tr* and turns the shaft A through a number of steps corresponding with the index number of the magnet. The gear wheels *tr* are coupled with shaft A in such a manner that they may turn along the shaft in one direction only; thus, the shaft does not turn when the toothed rack *ts* returns to its zero position after de-energization of the magnet.

The shaft A carries a scale member ST on which the check symbol may be read. Furthermore, the shaft A carries a contact disc SR which interconnects brushes $B_1$ and $B_2$ whenever the shaft A is in its zero position.

When one of the checking keys CT is pressed, the alarm relay AR is energized. This relay may actuate any kind of visual or acoustical alarm device, or it may block a machine controlled by the keys T and CT. If the right check symbol has been inserted by means of one of the keys CT, the shaft A is brought into its zero position, so that relay AR is short-circuited and the alarm is interrupted. Thus, a permanent alarm does only occur when the check symbol inserted by means of keys CT does not correspond with the number inserted by means of keys T, i.e. when there is an error either in the number or in the check symbol accompanying the number. A resistor R serves to prevent a short-circuit of the voltage source when the relay AR is short-circuited.

The keys bearing the figures from 1 to 9, and the checking key bearing the plus sign are each provided with a switch, by means of which one of the magnets $M_1$–$M_{10}$ is energized upon depression of the key. The keys bearing the figure 0 are not provided with such a switch, as these keys have only a function in the operation of the machine in which the device is incorporated. As appears from the drawing, the switches of the keys bearing a certain figure $p$ and serving for the odd positions in the symbol group are all inserted in the circuit of magnet $M_p$, and the switches of the keys bearing the figure $p$ and serving for the even positions, and of the checking key bearing the figure $p$, are all inserted in the circuit of magnet $M_{N-p}$, whereas the switch of the checking key bearing the plus sign is inserted in the circuit of magnet $M_1$. Hence, the indicator shaft is displaced over $p$ steps upon depression of a key bearing the figure $p$ and serving for an odd position, and over $(N-p)$ steps upon depression of a key bearing the figure $p$ and serving for an even position, or of the checking key bearing the figure $p$. Hence, upon selection of a symbol group to be checked, the indicator shaft is displaced over $t$ steps in total, wherein $t=a_1+N-a_2+a_3+N-a_4+a_5+\ldots$, so that $R_N(t)=R_N(G)$, and the correct check symbol is displayed by the indicator.

Figure 2:
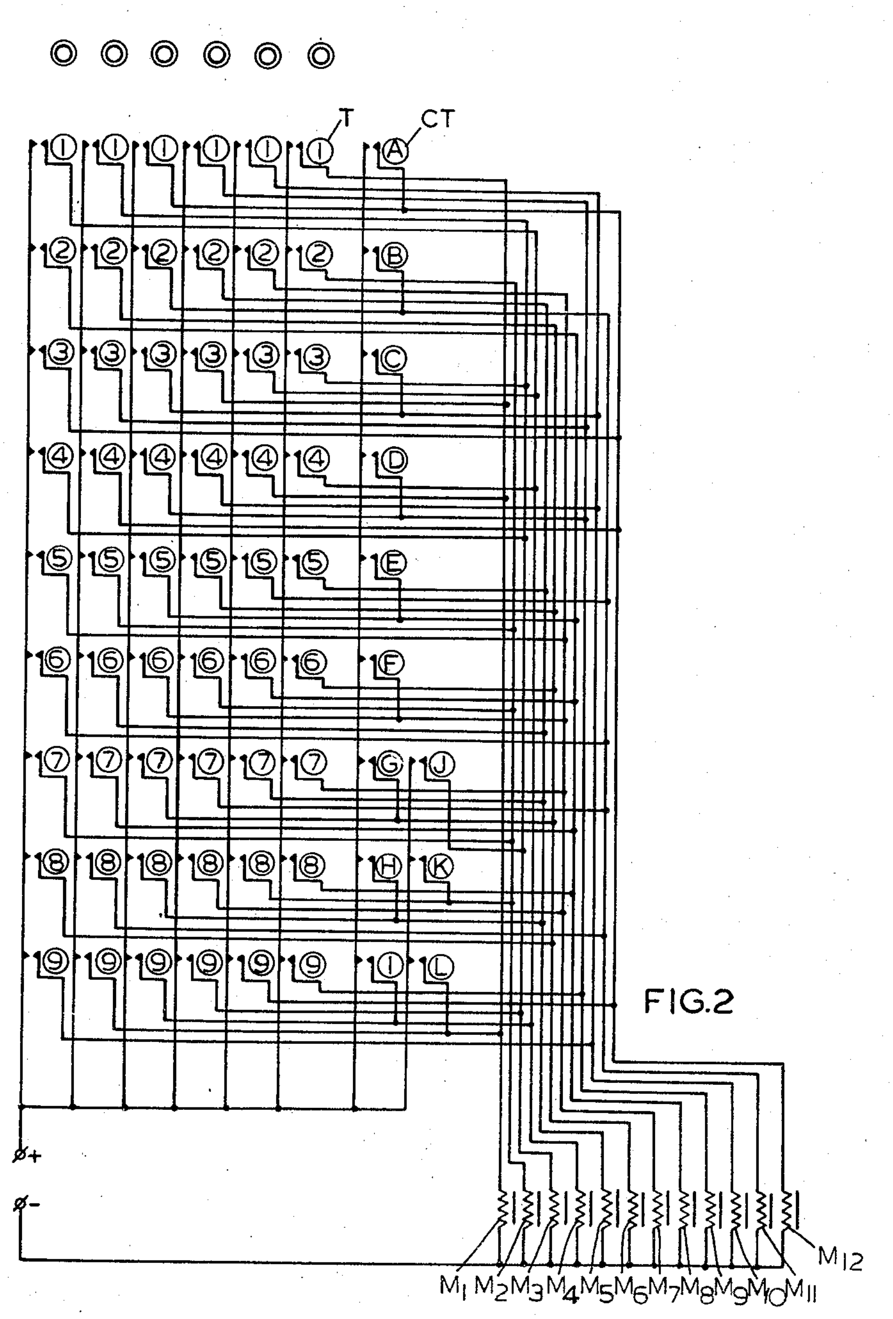
Fig. 2 is a circuit diagram of a device substantially corresponding with the device shown in Fig. 1, in which the number N is equal to 13, however.

In the device shown in Fig. 2, the number N is equal to 13, and the factors $k_i$ have been chosen as follows: $k_1=1$, $k_2=10$, $k_3=9$, $k_4=12$, $k_5=3$, $k_6=4$, $k_7=1$, and so on. The key group shown at the left in the drawing is fully identical with the left-hand key group in Fig. 1. The checking key group comprises twelve keys bearing the letters from A to L, letter A serving to indicate a remainder 1, letter B to indicate a remainder 2, and so on. Furthermore, twelve magnets $M_1$–$M_{12}$ are provided for driving the indicator shaft.

The circuit arrangement is such that the switch of a key bearing the figure $p$ and serving for position $i$ in the symbol group, is inserted in the circuit of magnet $M_j$, wherein $j=R_N(k_ip)$. For instance, the switch of key 6 for the third position from the right is connected with the magnet which displaces the indicator shaft over $R_{13}(54)=2$ steps, i.e. with magnet $M_2$. The switch of the checking key bearing the check symbol which indicates a remainder $q$ is inserted in the circuit of the magnet which displaces the indicator shaft over $R_N(-k_1q)$ steps; hence, the switch of checking key A is inserted in the circuit of magnet $M_{12}$, the switch of checking key B in the circuit of magnet $M_{11}$, and so on. Upon selection of a symbol group to be checked, the indicator shaft is displaced over a total number of steps which is equal to the check number of the symbol group but for a multiple of 13, so that the indicator displays the correct check symbol. By selecting this check symbol by means of the appropriate checking key, the indicator shaft is returned to its zero position.

The manner in which the switches of the checking keys are associated with the magnets may be expressed in a simple way by the following reasoning. Assume that the indicator occupies a position which is $s$ steps away from its zero position, and shows, in said first-mentioned position, a certain check symbol $C_s$. As the indicator has a closed cycle of N positions, it may be returned to the zero position by moving it on through $(N-s)$ steps. Hence, the checking key bearing the check symbol $C_s$ must control the switch connected with the magnet which causes a displacement of the indicator through $(N-s)$ steps.

We claim:

1. A device for determining a check symbol for a symbol group, comprising a key board having a separate key group for each position to be occupied by a symbol in a symbol group, a plurality of first switches each associated with one of the keys of said key board and each adapted to be closed by depression of the associated key, an indicator to be brought into a position corresponding with the pertinent check symbol by the selection of a symbol group by means of said key board, a voltage source, and a plurality of electrically operated driving members each adapted to displace said indicator through a different number of steps and each connected with said voltage source through at least one of said switches in such manner that the number of steps through which said indicator is displaced upon depression of any one of the said keys is equal to the remainder obtained on division by a fixed number N of the product of a value $a_i$ ascribed to the symbol selected by means of the key in question and a factor $k_i$ dependent on the key group to which this key belongs and being different for adjacent key groups.

2. A device as claimed in claim 1, in which said indicator is operable to a plurality of positions including a zero position and further comprising a separate group of checking keys for selecting the check symbol accompanying a selected symbol group, and a plurality of second switches each associated with a corresponding checking key and each adapted to be closed by depression of the associated checking key, the second switch associated with the checking key serving to select the check symbol shown by said indicator when the indicator is $s$ steps away from the zero position being connected with the driving member adapted to displace said indicator through $(N-s)$ steps so that said indicator may be returned to its zero position of the check symbol pertaining to a selected symbol group with the aid of said checking keys.

3. A device for determining a check symbol for a symbol group, comprising a key board having a separate key group for each position to be occupied by a symbol in a symbol group, a plurality of switches each associated with one of the keys of said key board and each adapted to be closed by depression of the associated key, an indicator to be brought into a position corresponding with the pertinent check symbol by the selection of a symbol group by means of said key board, a plurality of step magnets, a plurality of toothed racks each adapted to be displaced by one of the said step magnets and each having a different number of teeth, gearing means operative in only one direction for coupling the said toothed racks with said indicator, a voltage source, and means connecting each of the said step magnets with said voltage source through at least one of said switches in such manner of steps through which said indicator is displaced upon depression of any one of said keys is equal to the remainder on division by a fixed number N of the product of a value $a_i$ ascribed to the symbol selected by means of the key in question and a factor dependent on the key group to which this key belongs and being different for adjacent key groups.

4. A device for determining a check symbol for a symbol group, comprising a key board having a separate key group for each position to be occupied by a symbol in a symbol group, a plurality of first switches each associated with one of the keys of said key board and each adapted to be closed by operation of the associated key, an indicator having a zero position and operable to a position corresponding with the pertinent check symbol by the selection of a symbol group by means of said key board, a plurality of step magnets, a plurality of toothed racks each adapted to be displaced by one of the said step magnets and each having a different number of teeth, gearing means operative in only one direction for coupling the said toothed racks with said indicator, a voltage source, means connecting each of the said step magnets with said voltage source through at least one of the said switches in such manner that the number of steps through which said indicator is displaced upon operation of any one of said keys is equal to the remainder on division by a fixed number N of the product of a value $a_i$ ascribed to the symbol selected by means of the key in question and a factor dependent on the key group to which this key belongs and different for adjacent key groups, a separate group of checking keys for selecting the check symbol accompanying a selected symbol group, and a plurality of second switches each associated with one of said checking keys and adapted to be closed by operation of the associated checking key, the second switch associated with the checking key serving to select the check symbol shown by said indicator when the indicator is $s$ steps away from its zero position being connected with the step magnet adapted to displace said indicator through $(N-s)$ steps so that said indicator may be returned to its zero position by selection of the check symbol pertaining to a selected symbol group with the aid of the checking keys.

5. A device as claimed in claim 4, further comprising an alarm circuit, means operative upon operation of any one of the said checking keys for switching in said alarm circuit, and a switch coupled with said indicator for interrupting said alarm circuit in the zero position of said indicator.

6. A device for determining a check symbol for a symbol group, comprising a selector having a separate sub-selector for each position to be occupied by a symbol in a symbol group, each of the said sub-selectors consisting of a plurality of selecting elements each serving for the selection of a different symbol, a plurality of first switches each associated with one of said selecting elements and each adapted to be closed by operation of the associated selecting element, an indicator to be brought into a position corresponding with the pertinent check symbol by the selection of a symbol group by means of said selector, a voltage source, and a plurality of electrically operated driving members each adapted to displace said indicator through a different number of steps and each connected with said voltage source through at least one of said switches in such manner that the number of steps through which said indicator is displaced upon operation of any one of the selecting elements is equal to the remainder obtained on division by a fixed number N of the product of a value $a_i$ ascribed to the symbol selected by means of the selecting element in question and a factor $k_i$ dependent on the sub-selector to which this selecting element belongs and being different for adjacent sub-selectors.

7. A device as claimed in claim 6, in which said indicator is operable to a plurality of operative positions including a zero position and further comprising a separate checking selector for selecting the check symbol accompanying a selected symbol group, said selector consisting of a plurality of selecting elements each operable for the selection of a different check symbol, and a plurality of second switches each associated with a corresponding selecting element of said checking selector and each adapted to be closed by operation of the associated selecting element, the second switch associated with the selecting element serving to select the check symbol shown by said indicator when the same is *s* steps away from its zero position being connected with the driving member adapted to displace said indicator through (N–*s*)

steps so that said indicator may be returned to its zero position by selection of the check symbol pertaining to a selected symbol group with the aid of said checking selector.

References Cited in the file of this patent

UNITED STATES PATENTS 2,077,962 Smith ---------------- Apr. 20, 1937